(12) United States Patent
Sareen et al.

(10) Patent No.: US 7,634,465 B2
(45) Date of Patent: Dec. 15, 2009

(54) INDEXING AND CACHING STRATEGY FOR LOCAL QUERIES

(75) Inventors: Gaurav Sareen, Bellevue, WA (US);
Girish Kumar, Redmond, WA (US);
Qinghua Zou, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 357 days.

(21) Appl. No.: 11/460,807

(22) Filed: Jul. 28, 2006

(65) Prior Publication Data

US 2007/0078848 A1 Apr. 5, 2007

Related U.S. Application Data

(63) Continuation-in-part of application No. 11/323,241, filed on Dec. 30, 2005.

(60) Provisional application No. 60/723,576, filed on Oct. 4, 2005.

(51) Int. Cl.
*G06F 17/00* (2006.01)
(52) U.S. Cl. ............................................. 707/3; 707/10
(58) Field of Classification Search ................ 707/1–10
See application file for complete search history.

(56) References Cited

U.S. PATENT DOCUMENTS

| 5,822,749 | A | 10/1998 | Agarwal |
| 5,953,723 | A | 9/1999 | Linoff et al. |
| 6,629,132 | B1 | 9/2003 | Ganguly et al. |
| 6,868,410 | B2 | 3/2005 | Fortin et al. |
| 7,007,013 | B2 | 2/2006 | Davis, II et al. |
| 2003/0134648 | A1* | 7/2003 | Reed et al. ............... 455/456 |
| 2003/0212863 | A1 | 11/2003 | Ganguly et al. |
| 2004/0128215 | A1* | 7/2004 | Florance et al. ............ 705/28 |
| 2004/0138817 | A1 | 7/2004 | Zoken et al. |
| 2004/0220917 | A1 | 11/2004 | Evans et al. |
| 2006/0022048 | A1* | 2/2006 | Johnson ............... 235/462.1 |
| 2006/0075442 | A1 | 4/2006 | Meadow |
| 2006/0230024 | A1* | 10/2006 | Lei et al. ..................... 707/3 |
| 2007/0061245 | A1* | 3/2007 | Ramer et al. ................ 705/37 |
| 2007/0192300 | A1* | 8/2007 | Reuther et al. ............... 707/3 |

OTHER PUBLICATIONS

TIES428 Ubiquitous Computing http://www.cc.jyu.fi/!kurhinen/ties428_L4_06 last viewed Jan. 26, 2007, 4 pages.

(Continued)

*Primary Examiner*—Mohammad Ali
*Assistant Examiner*—John P Hocker
(74) *Attorney, Agent, or Firm*—Shook, Hardy & Bacon LLP

(57) ABSTRACT

The claimed subject matter relates to a computer-implemented architecture that can, at a high level, store query results in a location-independent manner in order to facilitate caching of local results. To store query results in a location-independent manner such that cached results to location-based queries can be useful, the architecture can further include a mechanism for encoding a surface or area (e.g., the earth) based upon document density rather than geography. The encoding mechanism can also organize an inverted index so that no join operation is required to return valid results to a location-based query. The architecture can also include a mechanism for determining when previously cached results are adequate to satisfy a query.

16 Claims, 15 Drawing Sheets

OTHER PUBLICATIONS

Keller, et al. "A Predicate Based Caching Scheme for Client Server Database Architectures" (1996) VLDB Journal, 10 pages.

Theodoridis, et al. "Ten Benchmark Database Queries for Location-based Services" (2003) The Computer Journal 46(6), pp. 713-725.

Krumm, et al. "Data Store Issues for Location-based Services" (2005) IEEE, 8 pages.

ORACLE. Oracle Locator-Data Sheet-Oracle Corporation. http://research.microsoft.com/ljckrumm/Publications%202005/data%20store%20foor%20lbs%20final last viewed Apr. 21, 2006, 13 pages.

* cited by examiner

INDEXING AND CACHING STRATEGY FOR LOCAL QUERIES

CROSS-REFERENCE TO RELATED APPLICATIONS

This application is a continuation-in-part of co-pending U.S. patent application Ser. No. 11/323,241, entitled "PHOTOGRAPHING BIG THINGS" filed on Dec. 30, 2005, which claims priority to U.S. Provisional Application Ser. No. 60/723,576, filed Oct. 4, 2005, entitled "PHOTOGRAPHING BIG THINGS." This application is also related to co-pending U.S. patent application Ser. No. 11/465,500, filed Aug. 18, 2006, entitled "A USER INTERFACE FOR VIEWING STREET SIDE IMAGERY" and to co-pending U.S. patent application Ser. No. 11/460,878, filed Jul. 28, 2006, entitled "STREET SIDE MAPS AND PATHS". The entireties of these applications are incorporated herein by reference.

BACKGROUND OF THE INVENTION

Maps have been created and used by mankind for thousands of years. They facilitate travel, logistics, planning, defining the boundaries of property rights, and the like. Cartography has changed dramatically because of advances in technology. The traditional tools of cartography such as the telescope, the sextant, and the compass are being replaced by digital photography, GPS surveying and computer databases. In addition to better surveying technologies, map presentation technology has changed dramatically as well. Traditional maps that were simply hand-drawings on paper are rapidly being replaced by computer displays that can provide dynamic information tailored to a specific user.

In addition, fixed maps, e.g. maps that have a fixed view and fixed information, are being replaced by dynamic maps where a user can select a specific view and customize the information that is displayed. Furthermore, searching functionality is common in many computer-based maps. A user of computer-based maps can usually select a position and conduct a search for specific information. That information may then be represented on the user's customized map, creating a representation that is tailored to the user's request(s).

Oftentimes the information sought out by a user may be information associated with a position or object rather than a physical characteristic. For example, one common use of interactive maps is to allow a user to search for a specific kind of business. For example a user may search for all businesses that sell pizza within a certain distance from a specific location. The results to such a search can yield a computer-implemented map that displays markers indicating all the pizza parlors in the relevant area. Moreover, in addition to the advances in interactive mapping, location-based information-gathering technologies have advanced rapidly as well. For instance, modern demographic techniques have arisen to determine very detailed information about locations, persons, businesses, etc. Furthermore, satellite images for every region of the earth have been obtained, and several conventional systems that utilize satellite (or other orthographic-style) imagery in connection with street-side imagery are in being developed and enhanced. The demands for these and other location-based information will continue to increase as more advances are made in the relevant fields.

However, with the increased availability of location-based information, it is becoming increasingly important for a mapping and/or location-based query system to provide efficient storage and retrieval mechanisms to reduce the resources required to operate the system. The combination of the aforementioned difficulties has resulted in inefficient mechanisms for facilitating location-based searching. No effective technology has previously been developed to adequately resolve the current difficulties related to location-based searching.

For example, there are inefficiencies in the prior art with regard to processing relevant information within a data store. Typically, a data store of location-related information utilizes two kinds of inverted indices, one for keywords and another for the location. The first inverted index can be implemented as a 2-dimensional array where the first column is an array of keywords and the second column is associated with a set of documents that contain that keyword. The second inverted index is also sometimes implemented as a 2-dimensional array in the prior art, where the first column is a location and the second column is a set of documents associated with the position indicated in the first column. When a user performs a search, there are generally at least three criteria associated with the search (1) the location to be searched; (2) the keyword to search; and (3) limiting criteria.

The limiting criteria can be, e.g. a radius limit that extends from the location to an arbitrary distance. Additionally or alternatively the limiting criteria can be a limit on the number of results returned such as returning the 100 closest results. Generally, the first inverted index is searched in which a set, S1, of documents are made that match the keyword. Next, some conventional systems perform a second search on the second inverted index. The search looks to the first column to determine how close that location is to the location is in the search string. If the limiting criteria are satisfied, the set is included in set S2. The computer continues to search and all sets that are returned are added to S2. When the search of the second inverted index is finished the set S2 is complete. Now the two sets must be intersected. The results are the intersection of S1 and S2, (S1∩S2). The aforementioned processed is a join operation (e.g., an inner join) for joining two inverted indices. This process is extremely expensive in terms of system resources and, as such, often referred to as the "join problem" because of the inefficiencies associated with this process.

In addition to the join problem, other difficulties exist. For example, many conventional systems rely exclusively on "back-end" evaluation of location-based queries. Back-end access typically involves disk reads, which can be orders of magnitude slower than accessing data in a cache. Implementing a system with a front-end cache is a common strategy in the prior art to increase efficiency in some fields. However, traditional caching schemes have failed to adequately employ caches for location-based queries because it is very rare for a search to be carried out from exactly the same location and with exactly the same keyword.

Generally, a location-based search involves two or three parameters. They are conducted as a search of a keyword from a certain location. There are no known strategies to determine if cached results are sufficient for a subsequent search made from a nearby location rather than from an exact location. This occurs because data in a cache is usually constructed based upon a previous search, such as the one described above, that goes to the back-end and joins two inverted indices. Hence, the data in the cache will be based upon a key that contains both keyword and location information. Thus, in order to retrieve a record (from either the back-end or the cache) the key must match exactly in both dimensions, which makes cached results of little value in conventional systems.

Therefore, what is needed is a solution that can remedy both the join problem and, as well, make use of a cache for storing location-based results in a manner that can be employed for subsequent queries, even when the location is not an exact match.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The claimed subject matter disclosed and claimed herein, in one aspect thereof, comprises an architecture that can provide a novel caching strategy for local queries. In accordance therewith, the architecture can facilitate caching of previous results to a location-based in a location-independent manner, by storing the results (e.g., documents) in a bag. Accordingly, a cache can include multiple bags, wherein each respective bag is associated with a location-independent key that relates to a search string of the previous location-based query. It is to be appreciated that just as different queries can employ the same search string (e.g. one query for the search string at location 1, and a second query for the search string at location 2), multiple bags can be associated with the same key, but each bag will contain its own unique results.

The architecture can also include a search component that can receive a new location-based query, remove the location information from the query (e.g., utilizes only the search string key), and can select a subset of bags in the cache in which the search string of the new query matches the key for the subset of bags. From amongst the subset of bags, the search component can also select a best bag. Often the best bag is determined based upon a location encoded in the bag (e.g., the location of the previous location-based search). That is, the bag with a location that is nearest to the location of the new query can be the best bag. In accordance with another aspect, the best bag can be selected based upon other criteria as well.

The search component can also determine whether the best bag satisfies a threshold, and if so, it is likely that cached results can answer the query rather than going to a back-end data store to answer the query. If the search component retrieves results from the back-end data store (e.g., the threshold was not satisfied, no best bag was located . . . ) then these results can be stored in a new bag in the cache.

In accordance with another aspect of the claimed subject matter, the computer-implemented architecture can determine if cached results are adequate to satisfy a new query. One way to determine if the bag has sufficient information is to construct two circles and compare the two. A first circle is related to the results contained within the bag while a second circle is related to the new query. A ratio relating to the area of overlap between the two circles can be calculated, and the search component can compare the calculation to the threshold. Depending on whether the threshold is met that bag may be determined to be sufficient to provide results for that query. For example, if the two circles overlap by a certain amount, such as 75%, then the bag may be determined to be sufficient to provide result of the query.

In accordance with yet another aspect of the claimed subject matter, the architecture can provide an encoding scheme for encoding a data store (or cache) in a location-independent manner such that no join operation is required to retrieve results for a location-based query. In one aspect thereof, the earth can be divided into blocks where each respective block can represent different areas of the earth. The blocks can be encoded to varying levels of depth (e.g., granularity) based upon a density of documents within the block. Each block can be assigned a block code based upon the location of the block.

The block codes can be sorted and assigned to a chunk ID, which can be concatenated with a document ID for each document in the chunk to yield a global document ID for each document. All documents can then be sorted by the global document ID and associated with an inverted index that returns the global document ID when the document contains the key of a query. In particular, a list of global document IDs for all documents containing the key can be returned in a location-independent manner and the location can be resolved by employing a binary search of the list for the chunk ID. Hence, a join operation need not be required to search in two dimensions (e.g., both keyword and location).

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DESCRIPTION OF THE INVENTION

Figure 1:
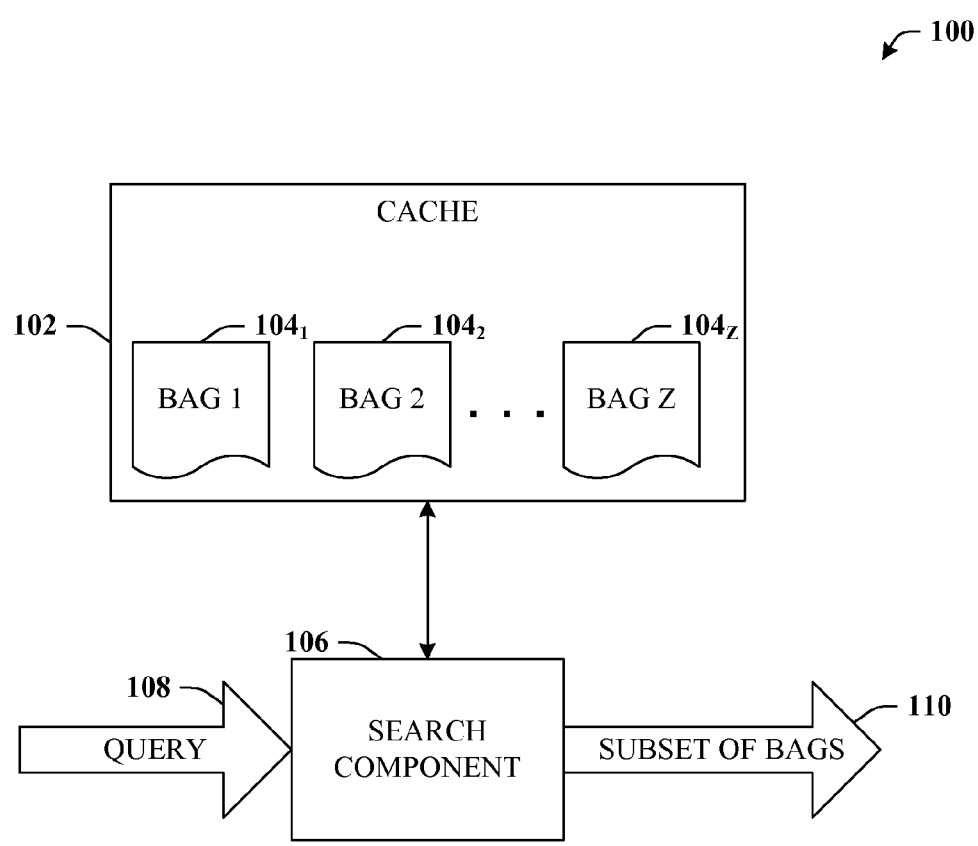
FIG. 1 is a block diagram of a computer-implemented system that facilitates caching of local results by selecting a subset of bags in response to a query.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the terms "location-based query" can denote a query that includes location-information. By contrast, the terms "location-independent", as used herein when referring to storing and/or accessing data, or to data structures does not necessarily mean there is no location information. Rather, location-independent can refer to the fact that data is not keyed to location information. In addition, the terms "cache" and "data store" can both be used to describe a repository for data. Therefore, given the broadest interpretation, the terms could be used substantially interchangeably in certain cases. However, a cache is generally considered to be a specialized repository for data, e.g., one that provides special functionality such as rapid access, etc.

Referring initially to FIG. 1, a computer-implemented system 100 that can facilitate caching of local results for location-based queries is illustrated. Generally, the system 100 can include a cache 102 that can be employed to mitigate a number of difficulties that exist in current location-based (as well as other types of) query systems. The system 100 can also include a search component 106 that can process a query 108 and can determine a subset of bags 110, as will be described in more detail infra.

As an exemplary illustration intended to aid in understanding but not to limit the claimed subject matter, consider the following conventional system: In location-based search systems today, when a user desires to perform a local search, e.g. to locate a nearby business, the user enters a search string, a location, and, optionally, a desired search radius (or other limiting criteria such as "the nearest 25 results" that match the search string). Typically, the search string is one or more words that conventional systems associate with a keyword. For instance, if the user enters the search string "pizza", then the system will use the term "pizza" as a keyword to locate documents that match that key (e.g. documents that contain the word "pizza" such as documents relating to pizza parlors, pizzerias, etc.). Generally, these documents are keyed to an inverted index such that the document record can be located by the search string/keyword.

In addition, the user specifies his or her current location by entering an address, a zip code, global coordinates based upon latitude and longitude, etc. as well as, optionally, a search radius or other limiting parameters. Each document is also keyed to inverted entries based upon location (e.g., the location of the local pizza parlor associated with the document). Thus, when a user performs a local search, the conventional system must perform a join operation on the two inverted indices, one for the keyword and another for the location in order to obtain valid results to the local search.

Typically, join operations are very expensive in terms of system resources. Moreover, these inverted indices are usually located on a "back-end" data store, which is far more inefficient to access than a local cache. Furthermore, the difficulties associated with join operations are often compounded because when the user conducts a local search, the user will often pan or zoom to examine the surrounding area. Accordingly, every search as well as every pan or zoom can require a new join operation and an expensive access to the back-end. Apart from the difficulties associated with join operations, there also exist difficulties with employing a cache. That is, conventional caching strategies require an exact match of both dimensions of the search (e.g., both keyword and location). While certain keywords may be common (e.g., "pizza"), it is exceedingly unlikely, that a subsequent search for that keyword will specify the same location, even when the location is very close such as from a pan operation.

In order to mitigate these and other difficulties associated with conventional systems, the cache 102 can be employed with various strategies for local caching, which are described herein. In accordance therewith, the cache 102 can be employed to serve results for many queries without accessing the back-end. Cache 102 can be, e.g. local memory (e.g., RAM) or some other medium that provides rapid data access relative to retrieving data from the back-end. In addition, cache 102 may be one or more specialized servers. For example, cache 102 can be a set of servers that house the data on an efficient RAID (Redundant Array of Independent Disks) hard drive array without compression, while the back-end could be other servers that, e.g. utilize computationally expensive, but space saving, compression techniques, and, especially in the case of vast amounts of data, may even employ tape drives that sacrifice speed for greater storage capabilities.

Cache 102 can also be a layered system wherein there are several mini-caches that make up the cache. Caching is not limited to a single machine and can be implemented in software, hardware, or some combination thereof. Oftentimes there are trade-offs between size, performance, and cost where differing strategies can be employed to adapt to the dynamic user demands on the system. Accordingly, the cache 102 can be tailored based upon various internal requirements as well as externalities.

Cache 102 can include a plurality of bags $104_1$-$104_Z$, referred to collectively or individually as bags 104. It is to be appreciated that although the bags 104 can be referred to collectively, hereafter each respective bag 104 can have unique properties that distinguish each of the bags 104. That is, each bag 104 can store results (e.g., documents) relating to a previous query (not shown), so bag $104_1$ can contain different results than bags $104_2$-$104_Z$. For example, if three previous queries requested 1) "pizza" in "Seattle, Wash."; 2) "pizza" in "Cleveland, Ohio"; and 3) "doctors" in "Seattle, Wash.", each bag 104 can include results (e.g., documents) of one of the three previous queries returned from the back-end (as will be described infra) that meet the criteria of the respective query. Alternatively, each bag 104 can be constructed based upon a heuristic and imported into the cache 102.

In more detail, bags $104_1$ and $104_2$ can include documents that relate to pizza (e.g., pizza parlor businesses), whereas bag $104_Z$ can include documents that relate to doctors (e.g., businesses in the medical profession). That is, each bag 104 can be associated with a single keyword. For example, bag $104_1$ can relate to all queries for "pizza" and bag $104_Z$ can relate to all queries for "doctors". In accordance with another aspect of the claimed subject matter, a bag 104 can be related to queries based upon similar keywords rather than identical keywords. For instance, the keywords of "pizza", "pizzeria", and "pizza parlor" can all reference bag $104_1$. In accordance with yet another aspect, each bag 104 can relate to a specific area and/or block and may contain all searches of a set of related keywords. For example bag $104_1$ can contain keyword searches of "pizza", "pizzeria", and "pizza parlor" but only for a specific block and/or location, such as "Seattle, Wash.".

It is to be appreciated that the documents in each of the bags 104 can be stored and/or accessed in a location-independent manner. That is, although the previous query that returned the documents included in bag $104_1$ specified location information associated with Seattle, Wash., this information need not be employed as a key to locate the documents. Each bag 104 can be related to a keyword or group of keywords, although multiple bags 104 in cache 102 may be related to a single keyword or identical groups of keywords. Additional strategies relating to location-independent storage and access will be described infra with reference to FIGS. 4 and 9-13.

It is also to be appreciated that although the previous queries have been described as accessing the back-end, this need not be the case. Rather, as will be described in more detail below, the cache 102 can answer many of the queries without going to a back-end data store. As such, bags 104 can include results obtained from queries answered by the cache 102 as well. In accordance therewith, a bag 104, as well as the documents contained in the bag 104, can be associated with a key that relates to a search string of a previous query. Typically, this can be accomplished by employing inverted indices in connection with the cache 102, as illustrated in FIG. 2.

Figure 2:
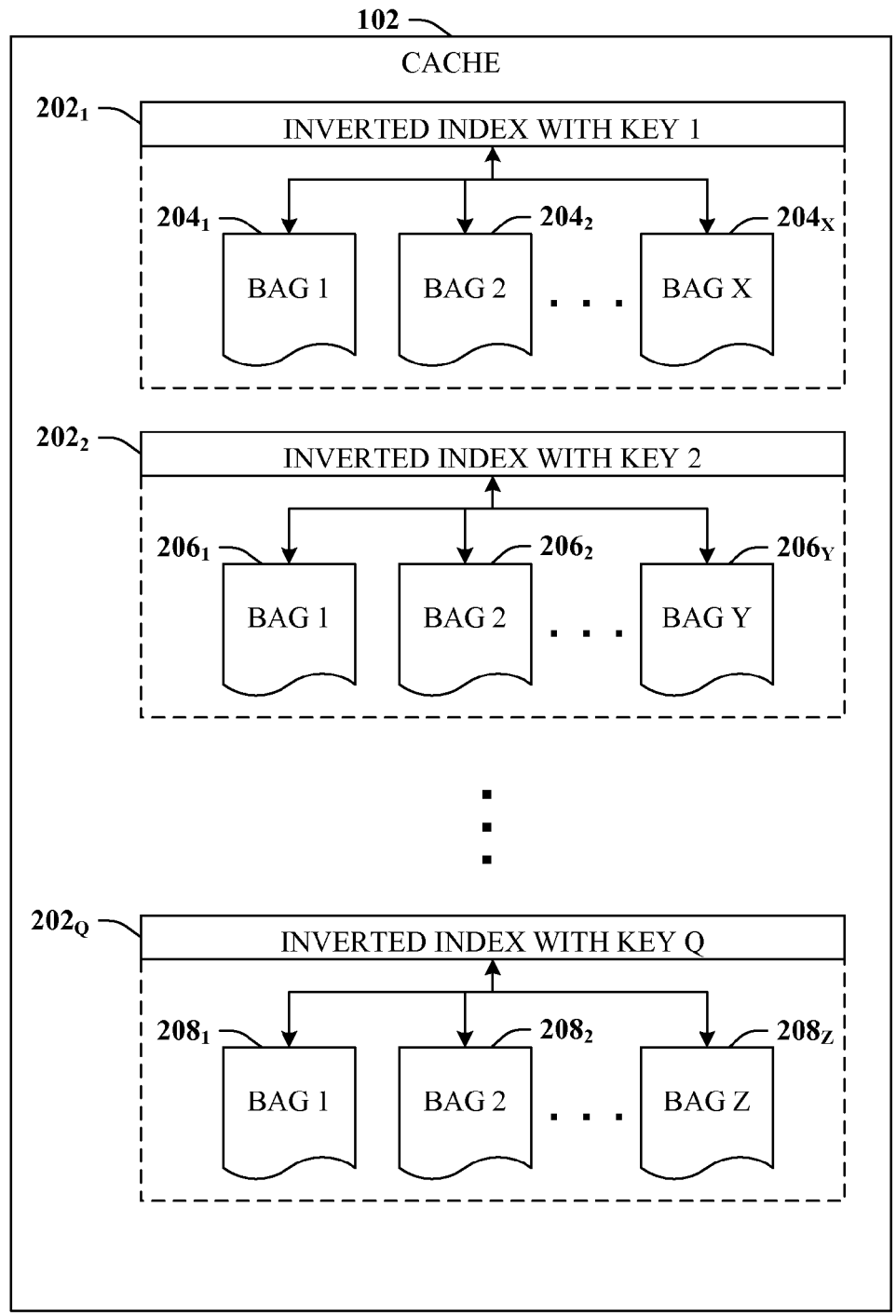
FIG. 2 is an exemplary cache with exemplary data structures therein.

Referring now to FIG. 2, the cache 102 is shown in greater detail in accordance with one aspect of the claimed subject matter. The cache 102 can include a plurality of inverted indices $202_1$-$202_Q$, that can be referred to either individually or collectively as inverted index 202. As depicted, inverted index $202_1$ is associated with key 1. Accordingly, inverted index $202_1$ can point to each bag 204 associated with key 1. That is, each bag 204 can be associated with key 1, and every document included in each bag 204 contains key 1. To continue the illustration from above, if key 1 is "pizza", then bag $204_1$ can contain the documents returned from the previous query of "pizza" in "Seattle, Wash."; bag $204_2$ can contain the documents returned from the previous query of "pizza" in "Cleveland, Ohio"; while all other bags 204 can include other results containing the key "pizza" (e.g., from various other locations).

Similarly, inverted index $202_2$ is associated with key 2, so if key 2 is "doctors", then all bags 206 can include documents relating to "doctors" that were previously returned (e.g., from a query that went to a back-end data store or from the cache 102). The cache 102 can include any number of inverted indices 202, however, unlike conventional systems, the inverted indices 202 need not be associated with location keys. Rather all keys can be search strings/keywords alone, and, as such, the keys are location-independent. In this manner, a hash table (not shown) can be employed to map a location-independent key to a list of bags (e.g., bags 204, bags 206, or bags 208) associated with a key (e.g., key 1-key Q).

Additionally or alternatively, cache 102 may have map (not shown) associating a keyword with a groups of inverted indices. To continue the example above, if inverted index $202_2$ has a keyword of "doctors" then the map could direct the system to these individual inverted indices 202. Also, the map can translate varying keywords into a relevant keyword found in inverted index 202. For example, if inverted index 202, was associated with the keyword "pizza", the map can translate the word "pizzeria" to the keyword "pizza" so that bags 204 could be utilized. Also, in accordance with another aspect, system 200 can house a translation component (not shown) where certain keywords are translated into more commonly used ones. For example a search for "foot doctors" can be translated to "podiatrist" by a translation component.

Figure 3:
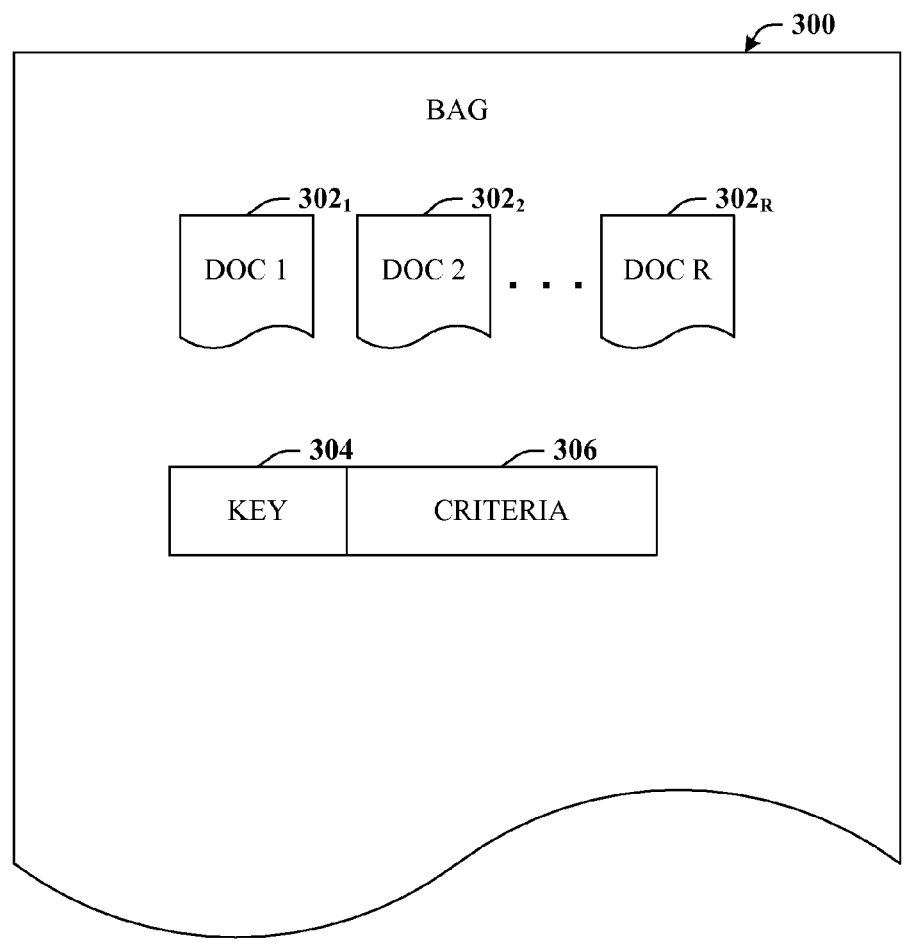
FIG. 3 illustrates an exemplary bag with exemplary data structures therein.

Turning now to FIG. 3, an exemplary bag 300 is depicted in greater detail in accordance with one aspect of the claimed subject matter. It is to be appreciated that bag 300 can exemplify bags 104 from FIG. 1 as well as all those described herein with reference to other figures. As described, supra, a bag (e.g., bag 300) can contain results of a previous query. Typically, these results are in the form of documents $302_1$-$302_R$, referred to herein either collectively or individually as documents 302. The bag 300 can also be associated with a key 304, and, accordingly, all documents 302 will generally also be associated with the key 304.

In accordance with another aspect, key 304 can be a hash function of a keyword. For example, if bag 300 is associated with the word "pizza" key 304 may be an MD5 (Message Digest 5) hash of keyword "pizza" which is "7cf2db5ec261aa0fa27a502d3196a6f60", or another type of hash function in existence or to be discovered. In addition, although the documents 302 can be accessed in a location-independent manner (e.g. the documents 302 are not retrieved and/or matched based upon location), the bag 300 can include such location information. For instance, location information can be stored in a data structure denoted criteria 306.

In accordance with still another aspect of the claimed subject matter, the documents 302 can contain location information. Location information can be a relative location such as a location of a business relative to a block or geographical region. Or the location information can be a fixed point, such as a Latitude and Longitude position. Also, location information can be an area that is small enough to provide enough accuracy for the purposes of the mapping system, such as an item being at least within 3 feet of a specific latitude and longitude; this is common when a GPS system is used and a location is based upon the accuracy of the device and/or available signals.

Again referencing the familiar example above, if a previous query requested "pizza" in "Seattle, Wash.", then the key 304 can be "pizza", all documents 302 can be results returned for that query (e.g., documents that contain the key, "pizza", in an area in and/or around Seattle, Wash.), and the criteria 306 can be "Seattle, Wash.". It is to be appreciated that when the criteria 306 are location information, as is the case here, such location information can be stored in any appropriate manner. In general, location information is stored in terms of latitude and longitude and can optionally include an accuracy parameter. Thus, even though a user will often input location information for a query in terms of a zip code or a municipality name, this information is readily converted to latitude and longitude coordinates. It is to be appreciated and understood that while criteria 306 are described herein in terms of location information, this need not be the only such information included in criteria 306. Other aspects will be described, infra.

In accordance with another aspect of the claimed subject matter, certain other types of location information can be inherently represented by the documents 302, even though this information is not expressly relied upon to address the data. For example, documents 302 can be sorted (e.g. ranked, ordered . . . ) based upon an ID described with reference to FIG. 4.

Figure 4:
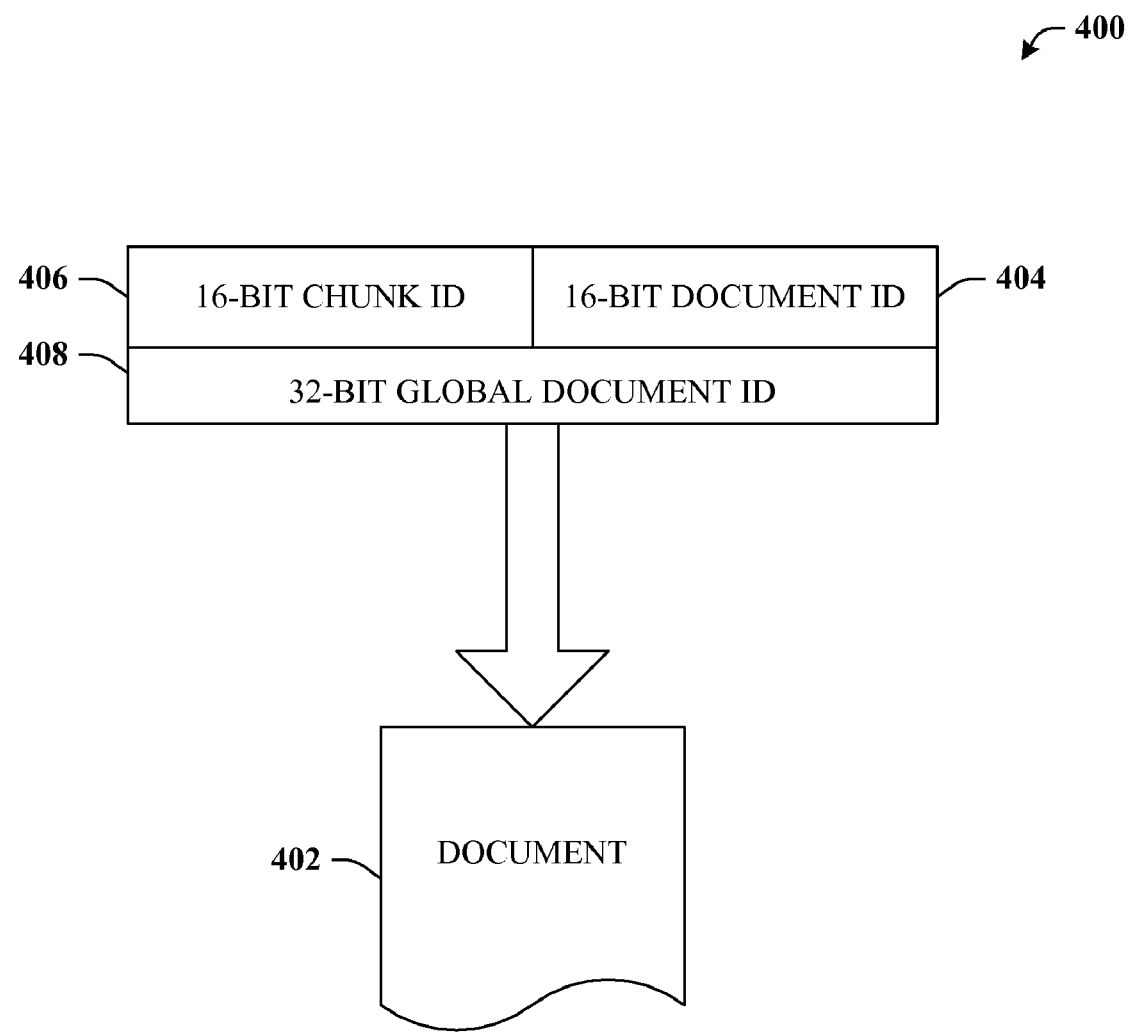
FIG. 4 illustrates a data structure architecture of a global document ID that refers to a document.

Turning briefly to FIG. 4, a data structure architecture 400 in accordance with one aspect of the subject invention is depicted. Generally, the architecture 400 relates to a mechanism for identifying a document 402, which is an exemplary embodiment of the documents 302 detailed in FIG. 3. A document 402 can be uniquely identified by a document ID 404, which can be a 16-bit integer. The architecture 400 can also include a chunk ID 406 which can also be a 16-bit integer. Chunk ID 406 is detailed further in connection with FIGS. 10 and 11, but briefly now, the chunk ID 406 can be a unique identifier associated with a geographic region of a surface (e.g., a particular area of the earth). In addition a 32-bit global document ID 408 can be generated by the combination of the chunk ID 406 and the document ID 404, with the chunk ID 406 assigned to the 16 most significant bits and the document ID 404 assigned to the 16 least significant bits.

In accordance therewith, the global document ID 408 can be a 32-bit integer employed to refer to document 402 in a manner that uniquely describes the document 402 and that is location-independent. In addition, referring simultaneously to FIGS. 3 and 4, the documents 302 can be sorted or ranked based upon the 32-bit integer global document ID 408 and/or based upon the criteria 306. Various uses of architecture 400, as well as the chunk ID 406 and the global document ID 408, will become apparent with reference to the remainder of the disclosure.

Referring again to FIG. 1, the system 100 can also include a search component 106 that can receive a query 108 (e.g., a location-based query 108). The search component 106 can remove any location-based information from the query 108, retaining, e.g. only the location-independent key defined by a search string of the query 108. The location-independent key can be employed by the search component 106 to select a subset of bags 110 from the plurality of bags 104. For example, as described supra (see e.g. the description relating to FIG. 2), a hash table can be employed to map a location-independent key to a list of bags 104 that contain documents with that key (e.g., subset 110).

In accordance with one aspect of the claimed subject matter, search component 106 can determine if the quality of the bags 104 (and/or the quality of the documents in the bags 104) is sufficient to return a subset of bags 110. Since, query 108 communicates search criteria (not shown) to search component 106, a determination can be made as to the quality of bags 104 within cache 102. Search component 106 can return a subset of bag 110 if the quality is sufficient. If no bags 104 are of sufficient quality search component 106 may search the "back end", or alternatively can communicate information to another component (not shown) about the insufficient quality of bags 104 related to query 108.

Referring simultaneously to FIGS. 1, 3 and 4, since the documents 302 can be ordered in the bag 300 by global document ID 408, and the chunk ID 406 representing a geographic region is the 16 most significant bits, the location information specified by the query 108 is not necessary. That is, all bags 104 included in the subset of bags 110 will contain documents associated with regions specified by the chunk ID 406. Hence the subset of bags 110 are guaranteed to be relevant to the location specified in the query 108 even though the inverted entries were not search base upon location, but rather with a location-independent key.

Figure 5:
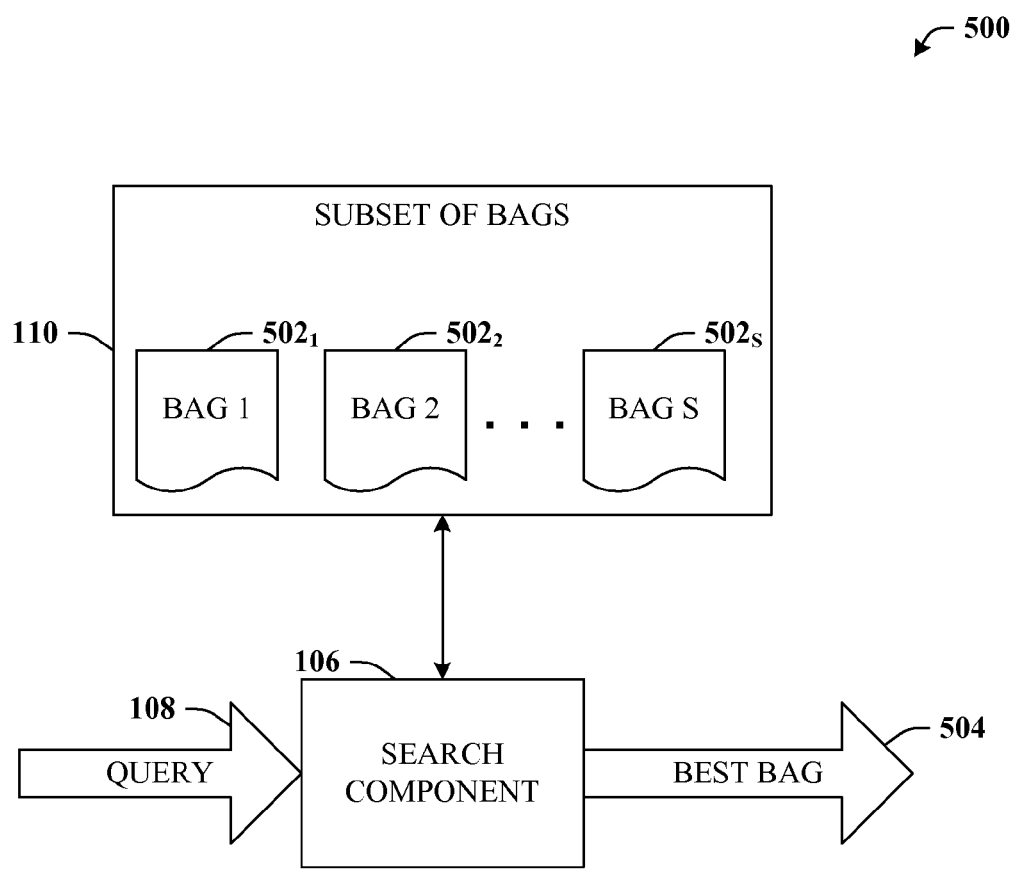
FIG. 5 depicts a block diagram of a computer-implemented system that facilitates caching of local results by selecting a best bag from among the subset of bags.

With reference now to FIG. 5, an exemplary computer-implemented system 500 that can facilitate caching of local results for location-based queries is illustrated. Generally, the system 500 can include a search component 106 that receives a query 108 and selects a subset of bags 110, as substantially described above in relation to FIG. 1. As depicted, the subset of bags 110 can include any number of bags $502_1$ to $502_S$, wherein S is a positive integer. The bags $502_1$ to $502_S$ can be referred to collectively or individually as bags 502, even though each of the bags 502 can have characteristics that distinguish from other bags 502. The search component 106 can select from the subset of bags 110 a best bag 504. Typically, the best bag 504 is the bag 502 that is closest in terms of geographic distance to the location specified in the query 108. Thus, although the location specified in the query 108 is not employed to locate documents within a bag 502 (since the key is location-independent), this information can be employed to locate the best bag 504.

In accordance with one aspect of the claimed subject matter, and referencing simultaneously FIG. 3, the best bag 504 can be determined based upon the criteria 306. That is, criteria 306 can include location-based information associated with a previous search (e.g. the previous search that was performed to populate the bag 300). Hence, the location information stored in criteria 306 for each of the bags 502 can be compared to the location information from the query 108. The nearest bag 502 to the location contained in the query 108 can be the best bag 504. However, it is to be appreciated that criteria 306 can include other data as well. Therefore, this other data can be employed in addition to location information or in the alternative. For example, factors such as price, reputation, etc. can also be utilized to select a best bag 504. In accordance with an alternative aspect, a ranking algorithm can be employed to determine the best bag 504, e.g., in the case where the criteria 306 is not or not solely location information. The search component 106 can include criteria such as a community rating, professional rating, religious requirements, user criteria, etc.

Figure 6:
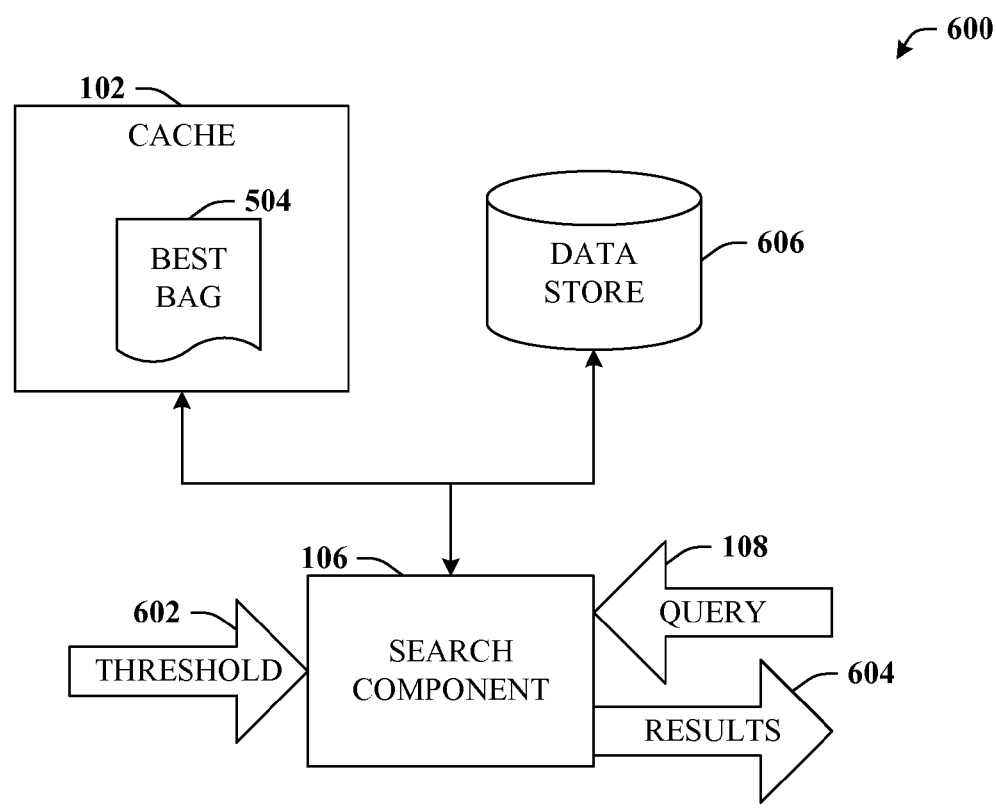
FIG. 6 illustrates a block diagram of a computer-implemented system that facilitates caching of local results by determining if documents in the best bag satisfy a threshold.

Referring to FIG. 6, an exemplary computer-implemented system 600 that can facilitate caching results and that can determine if the cached results meet a particular threshold is illustrated. In general, the system 600 can include a search component 106 that receives a query 108. From the information specified in the query 108, the search component 106 can identify a best bag 504 from the cache 102, as substantially described supra regarding FIG. 5. If the search component cannot locate a best bag 504 (e.g., no previous search was conducted with the keywords specified in the query), then the search component can redirect the query 108 to a back-end data store 606 where it can be satisfied, albeit not as efficiently as the cache 102. However, if a best bag 504 does exist, as illustrated, the search component 106 can also determine whether the best bag 504 satisfies a threshold 602.

If a the best bag 504 does not satisfy the threshold 602, then it can be assumed that the cache 102 does not contain documents capable of satisfying the query 108, at least not to a desired tolerance, since the threshold 602 is not met. Accordingly, the search component 106 can send the query 108 to the data store 606 in order to retrieve results 604 that pertain to the query 108. In both cases in which the data store 606 is accessed by the search component 106, the results 604 can be employed to populate the cache 102 as a new bag. Thus, subsequent searches can make use of this cached data.

On the other hand, if the best bag 504 meets or exceeds the threshold 602, then the documents contained in the best bag 504 can be considered to be highly relevant to the query 108, and can thus be employed to answer the query 108. That is, query 108 can be satisfied by at least a subset of the previously cached documents included in the cache 102. Hence, the search component 106 can return results 604 to answer the query 108, wherein the results 604 are retrieved from the cache 102 rather than the data store 606. As indicated, results 604 may be only a subset of the documents in the best bag 504 instead of all of the documents.

For example, since the documents in the best bag 504 can be indexed based solely on a search string or keyword (e.g., location-independent), the most common distinction between the query 108 and the previous query that generated the best bag 504 in the cache 102 will be a location-based difference. Therefore, since the location specified in the query 108 and the location associated with the best bag 504 will usually differ, it is common that some documents in the best bag 504 will not be relevant to the query 108. Likewise, there other documents not found in the best bag 504 might exist in the data store 606 that could be returned as results 604 if the query 108 were delivered to the data store 606. However, since the best bag 504 satisfies the threshold 602, this latter distinction can be considered as substantially negligible. It is to be further noted that since often only a subset of documents in the best bag 504 will be returned as results 604, the order of the documents (e.g., based upon the distance from the location specified in the previous query) must be resorted/re-ranked (e.g., based upon the distance from the location specified in query 108).

Figure 7:
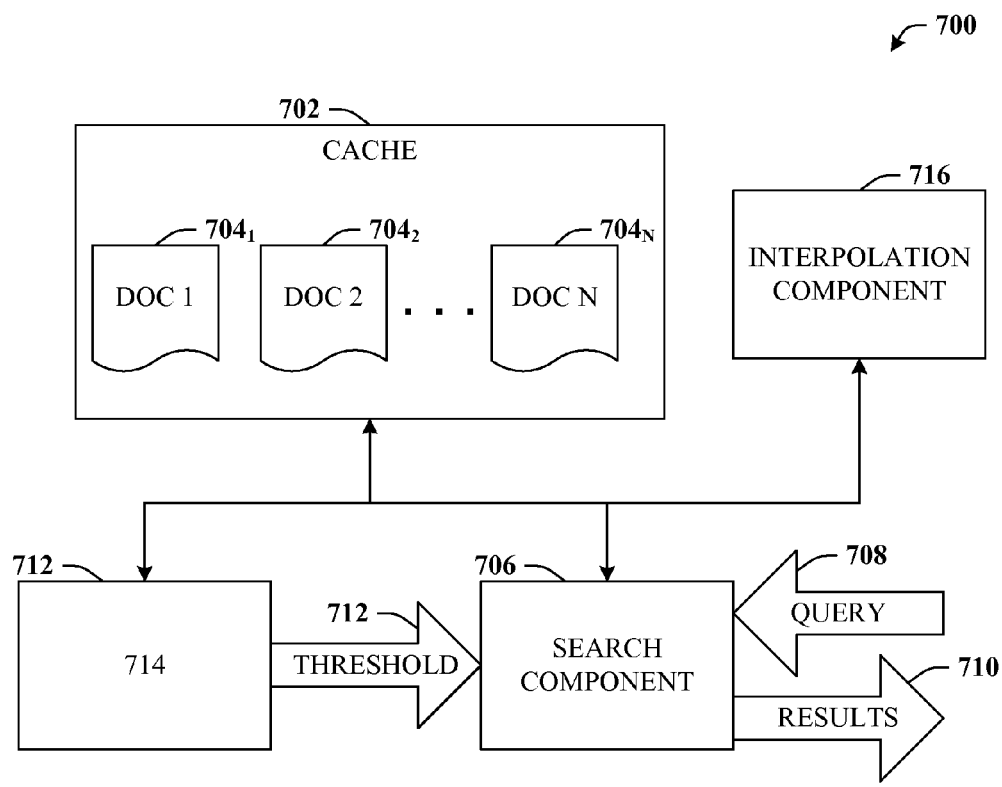
FIG. 7 depicts a block diagram of a computer-implemented system that can determine if cached results are adequate to satisfy a query.

In FIG. 7, an exemplary computer-implemented system 700 that can determine if cached results are adequate to satisfy a query is illustrated. In accordance with one aspect of the claimed subject matter, the system 700 can include a cache 702 with documents $704_1$-$704_N$, where N is a positive integer and where any of the documents $704_1$-$704_N$ can be referenced as document 704. Although not shown, the documents 704 can be contained in a bag. Moreover, for the sake of illustration, but not limitation, it can be assumed that the documents 704 are all in the same bag, which is analogous to the best bag 504 from FIGS. 5 and 6. It is to be further understood that since all documents 704 in the cache 702 most likely arose from a previous query, typically a query that went to the back-end, the documents 704 can be ordered (within the bag) based upon some criteria of the previous search. In general, these criteria are location information, and in that case, the documents 704 can be ordered based upon the respective distance from the location specified in the previous query. One skilled in the art can more fully grasp the concepts described herein with reference to FIG. 8.

Figure 8:
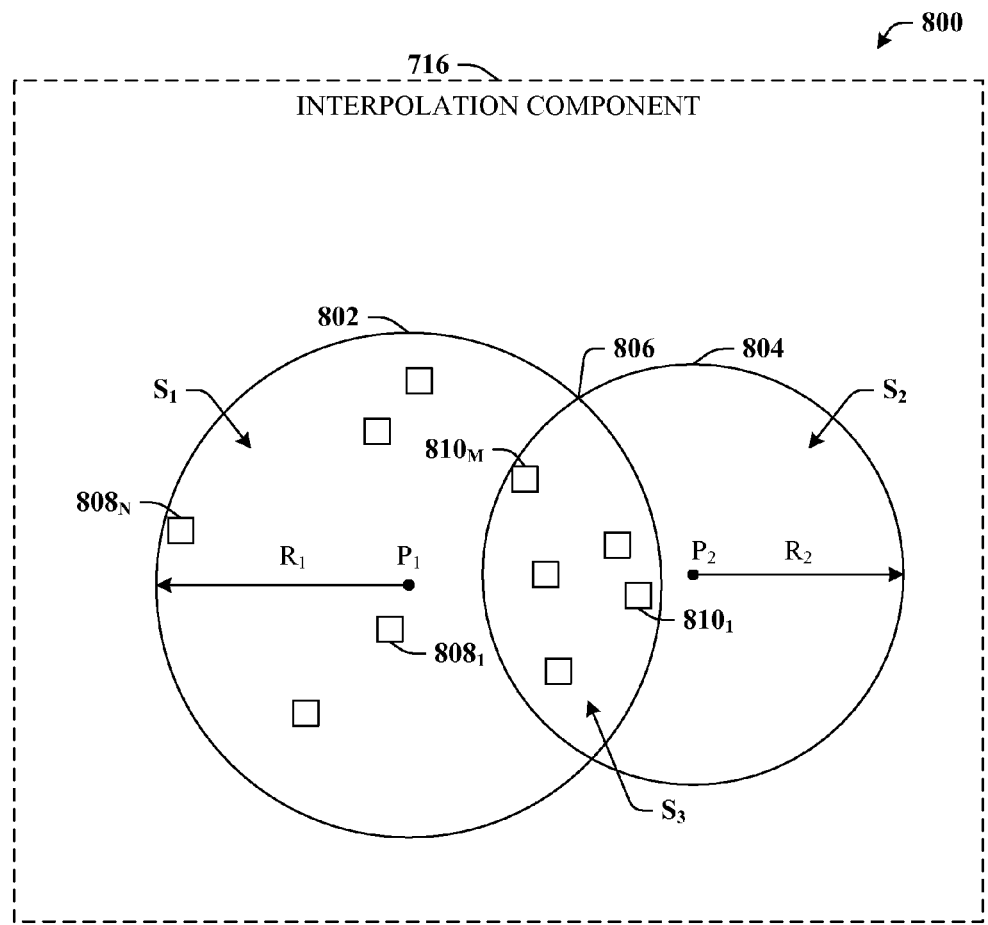
FIG. 8 illustrates an exemplary graph associated with location-based queries.

While still referencing FIG. 7, but turning also to FIG. 8, an exemplary graph 800 associated with location-based queries is depicted. Assuming that the results to a previous query generated the documents 704 in the cache 702, a graphical representation of these results can be described with reference to circle 802. The circle 802 is centered at $P_1$, which can signify the location specified in the previous query (e.g., the previous query that populated the cache 702 with the documents 704). The circle 802 can also be defined by radius, $R_1$, which sweeps out the area, $S_1$, of the circle 802. $R_1$ can be determined by the distance from $P_1$ to the Nth document, represented on the graph 800 by element $800_N$, which corresponds to document $704_N$ in the cache 702. Likewise, since element $808_1$ is the nearest element to $P_1$, element $808_1$ can be associated with the first ranked document $704_1$ in the cache 702.

As described previously, when the search component 706 receives a query 708, the search component 706 will generally respond to this query with appropriate results 710. A first question is whether the results 710 will be retrieved from the cache 702 or from a back-end data store, which can be answered at least in part by the interpolation component 716. Here, it is assumed that the documents 704 in the cache 702 are the results of a previous search that can be graphically represented by circle 802. In a similar manner, a second circle 804 can be interpolated over the first circle 802 based upon the parameters specified in the query 708. Circle 804 can be centered at $P_2$, which can represent the location specified in the query 708. Circle 804 has a radius, $R_2$, and bounds an area, $S_2$. An area of overlap, $S_3$, bounded by the intersection 806 of circles 802 and 804 can contain a subset of the documents 704 in the cache 702, each of which corresponds to an element $810_1$ to $810_M$ within the area $S_3$, and re-sorted based upon the distance from $P_2$. Accordingly, only this subset of documents 704 might be relevant to the query 708.

Appreciably, the subset of documents 704, described by elements $810_1$ to $810_M$ can be analogous to selecting a subset of documents in the best bag 504 described with reference to FIG. 6. Thus, whether or not the cached documents 704 are adequate to satisfy the query 108 can again be determined by a comparison to a threshold (e.g., threshold 712). In accordance therewith, the search component 702 can compare data obtained from the interpolation component 716 to the threshold 712. In particular, the interpolation component 716 can provide a ratio of the area of overlap, $S_3$ to the area of the circle 804, $S_2$. It has been determined that when the ratio, $S_3/S_2$ is about 0.75, then the documents 704 in the cache 702 are able to answer approximately 90 percent of the local queries 708 with a negligible difference between data delivered from the cache 702 as opposed to data that would be delivered from a back-end data store employing the same query 708.

Thus, threshold 712 can be a predetermined value, set, e.g., to 0.75, or some other number which could vary based upon a variety of factors such as the type of query, the density and/or types of documents 704, and the like. Regardless of the value of threshold 712, if the data supplied by the interpolation component 716 (e.g., a ratio of the areas $S_3/S_2$) is greater than or equal to the threshold 712, then documents 704 in the cache 702 are deemed satisfactory to supply results 710 to the query 708. In contrast, if the threshold 712 is not met, then the search component 706 may need to go to the back-end to return results 710.

In accordance with another aspect of the claimed subject matter, the threshold 712 can be a dynamic value as well. For example, the threshold 712 can be largely based upon a predetermined value (e.g., 0.75), but vary slightly in order to optimize the quality of results 710 returned from the cache 702. In accordance with another aspect, the threshold can be determined and/or inferred either in whole or in part by an intelligence component 714. The intelligence component 714 can be integrated in the search component 706 or, as depicted here, be operatively coupled to the search component 706. The intelligence component 714 can, inter alia, examine factors relating to empirical data compiled in connection with the claimed subject matter, as well as various external parameters.

For example, the intelligence component 714 can examine the entirety or a subset of the data available (e.g. data relating to the documents 704, the query 708, the cache 702 . . . ) and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 9:
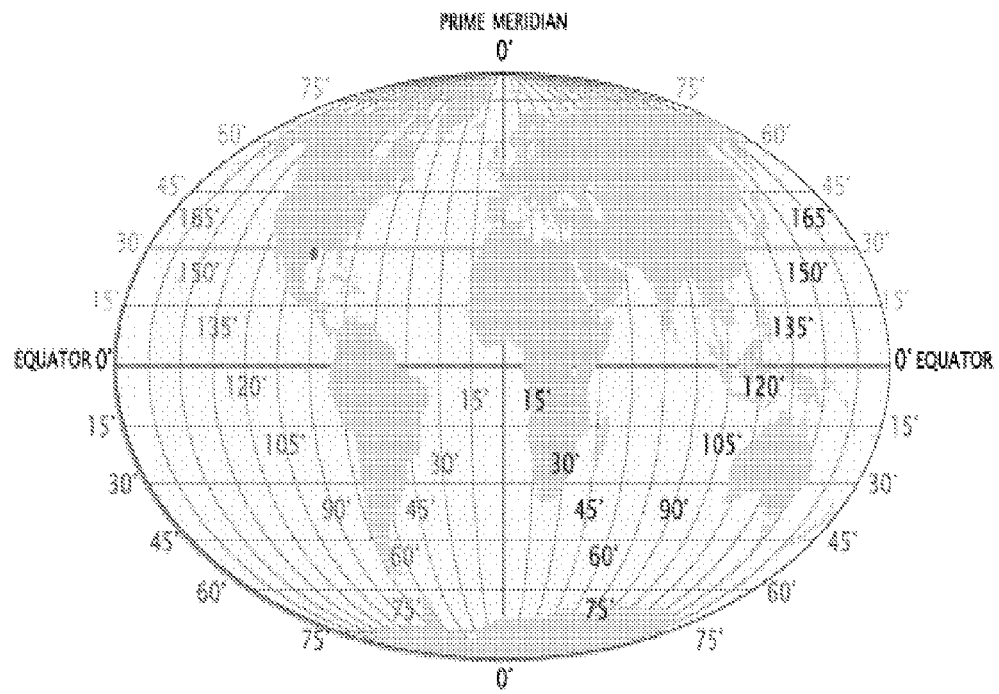
FIG. 9 is a graphic representation of the earth showing latitude and longitude.
Figure 10A:
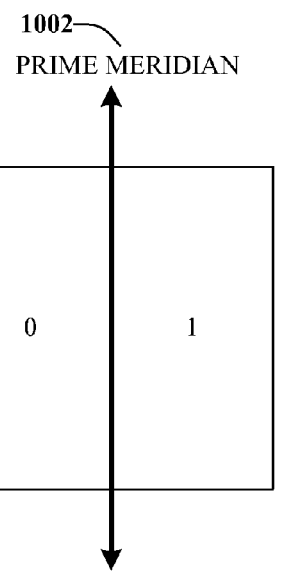
FIGS. 10A-10C illustrate exemplary architectures for encoding a data store such that no join operation is required to retrieve results for a location-based query.
Figure 10B:
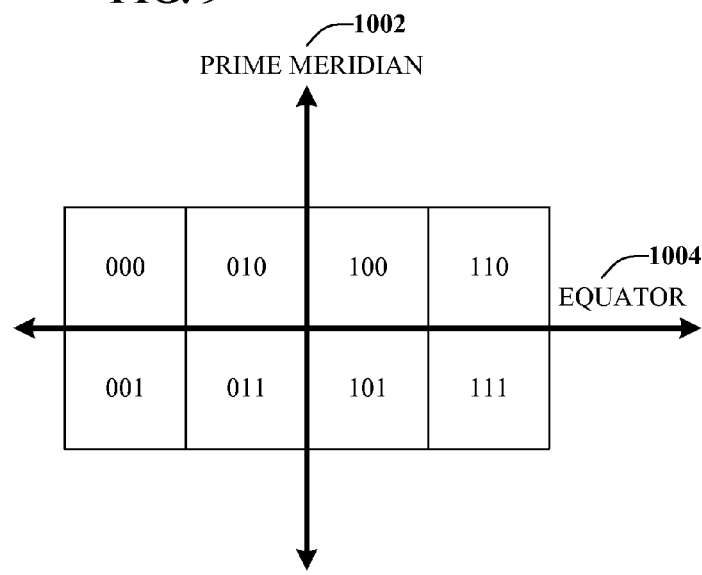
Figure 10C:
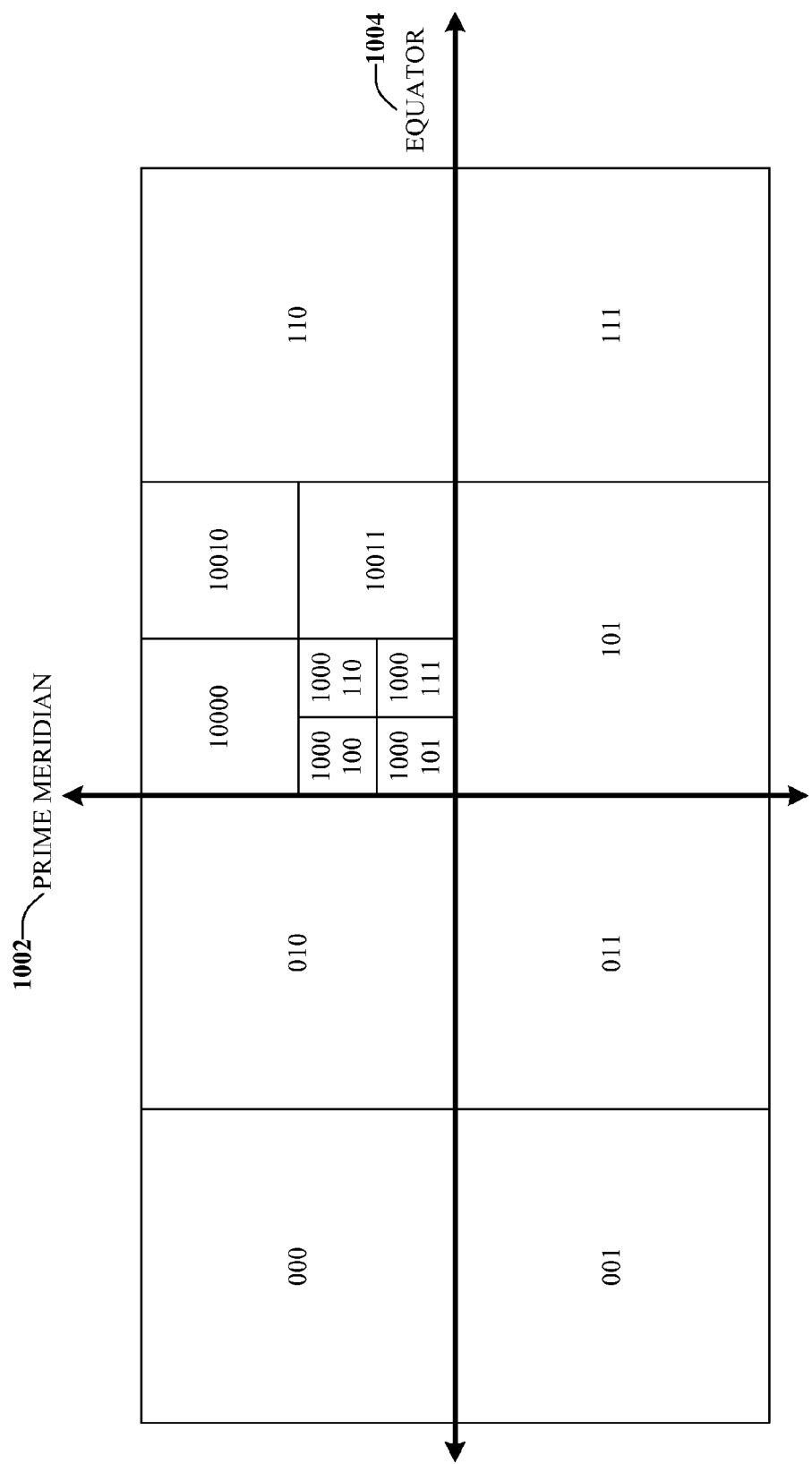
Figure 11:
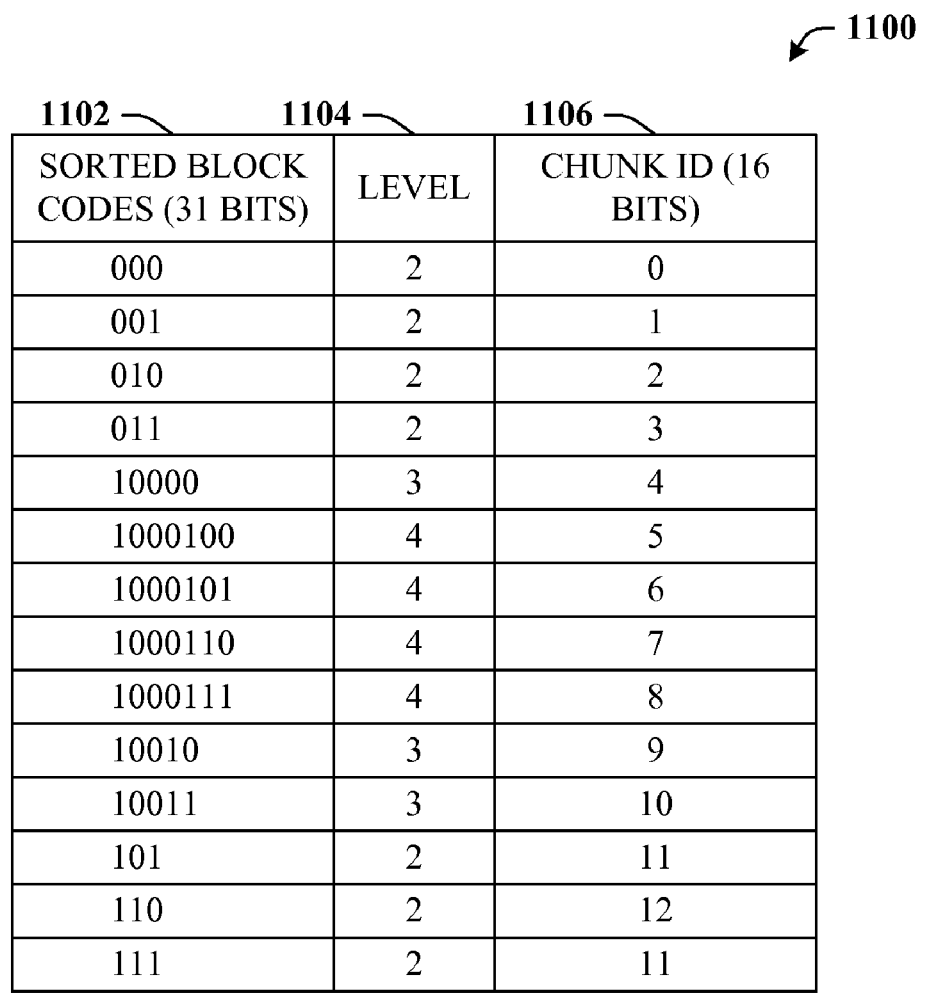
FIG. 11 is an exemplary table that corresponds to data from FIG. 10C illustrating the assignment of chunk IDs to block codes.

FIGS. 9-11 relate to various novel strategies and/or architectures for encoding a data store such that no join operation is required to retrieve results for a location-based query. As described above, achieving such a result is advantageous due to the inefficiencies associated with join operations. Moreover, the various architectures can apprise one of ordinary skill in the art of additional aspects of the claimed subject matter, including, but not limited to completing the picture of how location-independent keys can be effectively employed in connection with location-based queries.

Turning briefly to FIG. 9, a graphic representation of the earth showing latitude and longitude is depicted. By employing latitude and longitude, any position on the earth (or other surface) can be located. In particular, latitude, commonly represented as a horizontal line, is the angular distance, in degrees, minutes, and seconds of a point north or south of the Equator. Lines of latitude are often referred to as parallels. Similarly, longitude, often depicted as a vertical line, is the angular distance, in degrees, minutes, and seconds, of a point east or west of the Prime (Greenwich) Meridian. Lines of longitude are generally referred to as meridians.

With reference now to FIGS. 10A-10C, three block diagrams, each portraying an aspect of a novel encoding scheme that can facilitate dividing a surface (e.g., the surface of the earth) into regions of varying sizes based upon a depth level is illustrated. Location information for the surface (e.g., latitudes and longitudes) can be divided into blocks, level by level, depending on the density of documents within the respective blocks. Each block can be represented by a 31-bit binary code; however, the only bits that are significant are the first 2l−1 bits, where l is the level of the block. Hence, at level 1, only 1 bit is necessary to encode the surface, since the entire surface can be separated by the prime meridian 1002 (e.g., latitude=0 degrees). The westward (e.g., left) half of the surface can be coded with 0, while the eastward (e.g. right) half can be represented by 1, as depicted in FIG. 10A.

However, the granularity of a block at level 1 is quite coarse since the block will represent half of the entire surface. Accordingly, the granularity of the blocks can be enhanced by increasing the depth level. At each subsequent depth level, a block can be divided into four parts (or sub-blocks) by the center longitude and the center latitude of the parent block. It is to be appreciated that increasing the depth level of a block by 1 also increases the number of bits required to describe the block. Thus, in addition to the bits for the parent block, each of the four sub-blocks can have two additional bits (e.g. 00, 01, 10, and 11) appended to the next most significant digits, where the first of the additional bits is for longitude (0: west/left, 1: east/right), while the second of the additional bits can denote latitude (0: north/upper, 1: south/lower). FIG. 10B illustrates the earth with a prime meridian 1002 and an equator 1004, wherein the surface of the earth is divided into blocks at level 2.

It is to be understood and appreciated that the level of a block can be adjusted independently of other blocks. Hence, the architecture described thus far need not maintain equal depth levels for all blocks. Just as population densities vary broadly across the surface of the earth, document densities can vary as well. That is, since location-related documents are not evenly distributed throughout the earth, the blocks can be divided into different granulites (e.g., levels) as shown in FIG. 10C. Since the dividing scheme is more interested in the density of documents within a block than the geographic size of the block, an optimal dividing scheme is one in which each block contains about the same magnitude of documents and less than $2^{16}$ or 65,536 documents.

Because blocks can be described by a 31-bit code, it is very convenient to utilize a 32-bit integer to represent to block codes. Such a data structure (e.g., a 32-bit integer) allows blocks to realize a depth level up to 16, or a maximum of 65,536 blocks. The circumference of the earth at the equator 1004 is approximately 25,000 miles. When this circumference is divided by 65,536, the result is about 0.38 miles. Hence, the maximum longitudinal distance of a block at level 16 is 0.38 miles, and increasingly less as latitude increases away from the equator 1004. Such an exceedingly high level of granularity is currently much more than is necessary in practical situations; however, it is to be understood that even finer levels of granularity are envisioned and conceivable, and are considered to be within the spirit and scope of the claimed subject matter.

In addition, one of ordinary skill in the art might notice that, since the block codes can be represented by 32-bit integers, the resulting integers for block code 1, block code 100 and block code 10000 from FIGS. 10A, 10B, and 10C respectively, would all be identical (e.g., the resulting integer for each of these block codes would be a 1 followed by 31 0's). Thus, it may not be obvious how the dividing scheme can distinguish between the resulting integers and/or the depth level of a block by looking at the integer alone. However, this need not create a problem, for at least two reasons. First, if block code 10000 exists, then it is known that block codes 1 or 100 cannot exist. That is, when block code 1 was divided into sub-blocks, block code 1 no longer exists. Rather, the northwest/upper-left sub-block 100 subsumes the integer identity of the parent block code 1. Second, as will be described, infra with reference to FIG. 11, the block codes are sorted. Hence, block codes 1, 100, and 10000 would all occupy the same location in the list, irrespective of the level of the particular block code and the actual level of a block is often not required to be known.

Turning now to FIG. 11, an exemplary table 1100 that can facilitate assigning chunk IDs to sorted blocks is depicted. Typically, once the dividing scheme described above in connection with FIGS. 9-10C has been finalized (e.g., such that each block contains about the same magnitude of documents and less than $2^{16}$ or 65,536 documents), the documents in each respective block can be assigned to a respective chunk. Accordingly, table 1100 illustrates the aforementioned aspects by populating a block code column 1102 and, optionally, a depth level column 1104 with corresponding data established by the dividing scheme above. In this case, table 1100 is populated with data from the dividing scheme described in FIG. 10C. It is to be appreciated that the block codes in column 1102 are sorted in alpha-numeric order, and, as such, each neighbor to a block code in the column 1102 will also be a geographic neighbor in the dividing scheme.

Column 1106 depicts the chunk IDs assigned to each block code. Assigning a chunk ID is a straightforward numbering from 0 to n–1, where n is the total number of block codes contained in the table 1100. Here, n is 14, so the chunk IDs assigned range from 0 to 13. Although the block codes can require 31 bits, a chunk ID can be represented by only 16 bits, and still have one chunk ID for each block code. In particular, block codes are concerned with providing a requisite level of granularity, (e.g., up to depth level 16), but only where it is needed, such as only in geographic regions with a relatively high document density. In contrasting geographic regions (e.g., in other blocks) with a relatively low document density, a lower depth level can provide adequate granularity, and, as such, fewer blocks (and associated block codes) than are possible will be required. Moreover, not all possible block codes can exist simultaneously, e.g., if block code 1 exists, it is known that block codes 100, 10000, etc. do not and vice versa. Accordingly, due to the scarcity of data, a 16-bit chunk ID is adequate to represent all 32-bit block codes.

In accordance therewith, since each block can contain up to 65,536 documents (as provided for in the dividing scheme supra), and each block can be assigned to a chunk, each chunk can also contain a maximum of 65,536 documents. Thus, each document within a chunk can be assigned a unique identifier or document ID. Since $2^{16}$=65,536, the document ID can be represented with 16 bits to guarantee that the document ID can be unique for all documents in a chunk. In addition, the 16-bit document ID can be appended to the 16-bit chunk ID to produce a global document ID, which can uniquely identify the document for the entire earth/surface. For an example of these data structures, the architecture 400 of FIG. 4 can be referenced.

It is to be appreciated that although the dividing scheme described above as well as the data structures for representing the various elements associated with the table 1100 and architecture 400 (e.g., block codes, chunk IDs, document IDs, global document IDs) have been very specifically described to aid in understanding the claimed subject matter as well as to optimize the claimed subject matter with regard to present externalities, other implementations are contemplated. For example, the scope of the invention is not limited to 31-bit block codes, 16- and 32-bit IDs, etc. even though given the present circumstance these values are both convenient and superlatively adequate to handle all the potential documents and queries relating to a surface (e.g., the earth). As such, changes to certain aspects are envisioned, if not expected, that might change the scale, but not the essence of the claimed subject matter.

Figure 12:
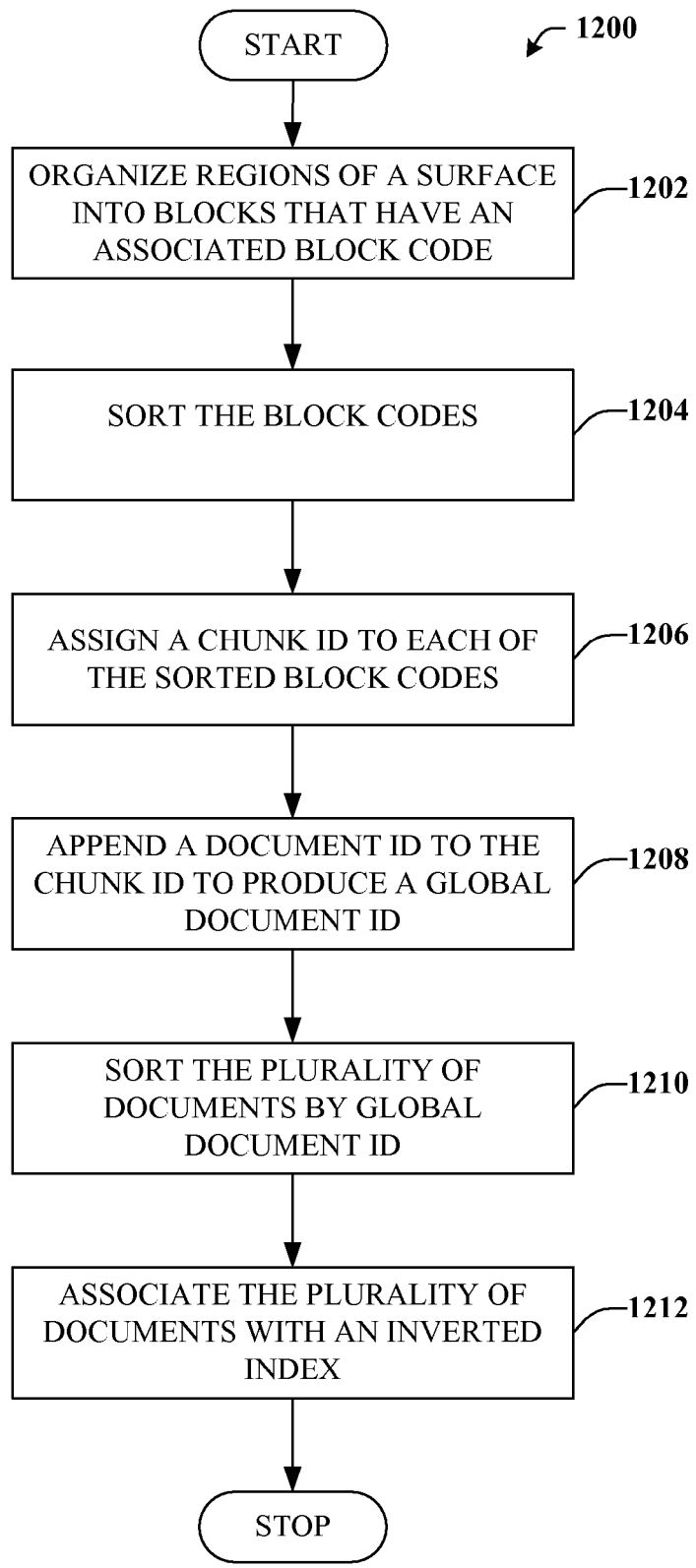
FIG. 12 is an exemplary flow chart of procedures for encoding a data store in a location-independent manner such that no join operation is required to retrieve results for a location-based query.
Figure 13:
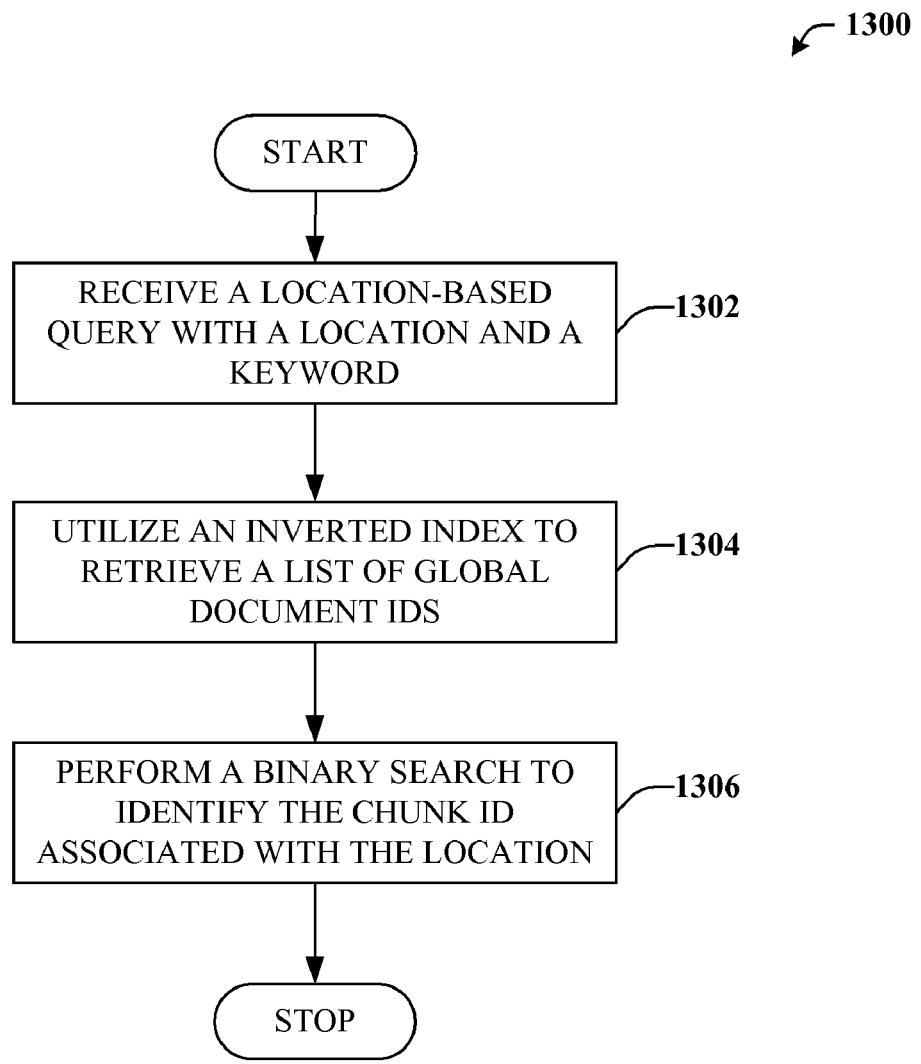
FIG. 13 depicts exemplary flow chart of procedures for satisfying a location-based query without performing a join operation.

FIGS. 12 and 13 illustrate process flow diagrams of computer-implemented methods. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the claimed subject matter, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Referring now to FIG. 12, an exemplary flow chart of procedures defining a method 1200 for encoding a data store in a location-independent manner such that no join operation is required to retrieve results for a location-based query is illustrated. At 1202, geographic regions of a surface such as the surface of the earth can be organized or encoded into blocks. In accordance with the dividing scheme described supra, the blocks can be independently apportioned into sub-blocks of varying depth levels (e.g., up to level 16) such that each block includes a substantially similar magnitude of documents. Generally, each of the blocks will have a corresponding block code (e.g., a 31-bit binary code) assigned base upon the geographic region of the block.

At 1204, the block codes can be sorted, for example, in a standard alpha-numeric order. At 1206, a chunk ID (e.g., 16 bits) can be assigned to each of the respective sorted block codes. Typically, the chunk IDs range from 0 to n–1, where n is the number of block codes available. Thus, the first block code in the sorted list of block codes is assigned to chunk ID "0", the next block code in the sorted list assigned to "1", and so on. At 1208, a document ID (e.g. a 16-bit value that uniquely identifies a document within a chunk in a location-independent manner) can be appended to the chunk ID such that the chunk ID supplies the most significant bits and the document ID fills the least significant bits. The concatenation of the chunk ID and the document ID can represent a global document ID, the uniquely describes a document not only within a chunk, but globally as well.

At act 1210, a plurality of documents can be sorted by global document ID. At 1212, the plurality of documents can be associated with an inverted index, which can, e.g., return inverted entries based upon a key. In general, the inverted index will be employed to return the global document ID of any document that contains the supplied key. It is to be appreciated that since the most significant bits (e.g. 16) of the global document ID is comprised of the chunk ID, relevant results a location-based query can be acquired without an expensive join operation on two inverted indices. Rather, the documents that satisfy the keyword of the query can be properly limited to only the relevant segment of documents (ordered by global document ID, with chunk ID the most significant bits) by performing a binary search to identify the chunk ID associated with the location information specified in the query. These and other aspects will be described in more detail with reference to FIG. 13.

Turning now to FIG. 13, an exemplary flow chart of procedures defining a method 1300 for satisfying a location-based query without performing a join operation is depicted. At 1302, a location-based query can be received. Generally, the location-based query contains a location and a keyword. At 1304, the inverted index detailed at act 1212 in connection with FIG. 12 can be utilized for retrieving a list of global document IDs relating to documents that include the keyword. Accordingly, this list of global document IDs can conceivably relate to documents at any location, much of which may not be relevant to the location-based query.

However, at 1306 a binary search for the chunk ID associated with the location specified in the query can be performed. For example, returning once more to the example provided supra, if the location-based query specified "pizza" in "Seattle, Wash." then the inverted index could be utilized to locate all the documents containing the word (e.g., keyword) "pizza". While these documents can be associated with any location, the global document IDs are ordered, so all the documents relevant to "Seattle, Wash." will be contiguous because they can all have the same (or similar, e.g. one-up and one-down) chunk ID, which is the chunk ID associated with "Seattle, Wash.". Accordingly, a binary search can be performed for this chunk ID, and results to the location-based query can be returned without a join operation.

Figure 14:
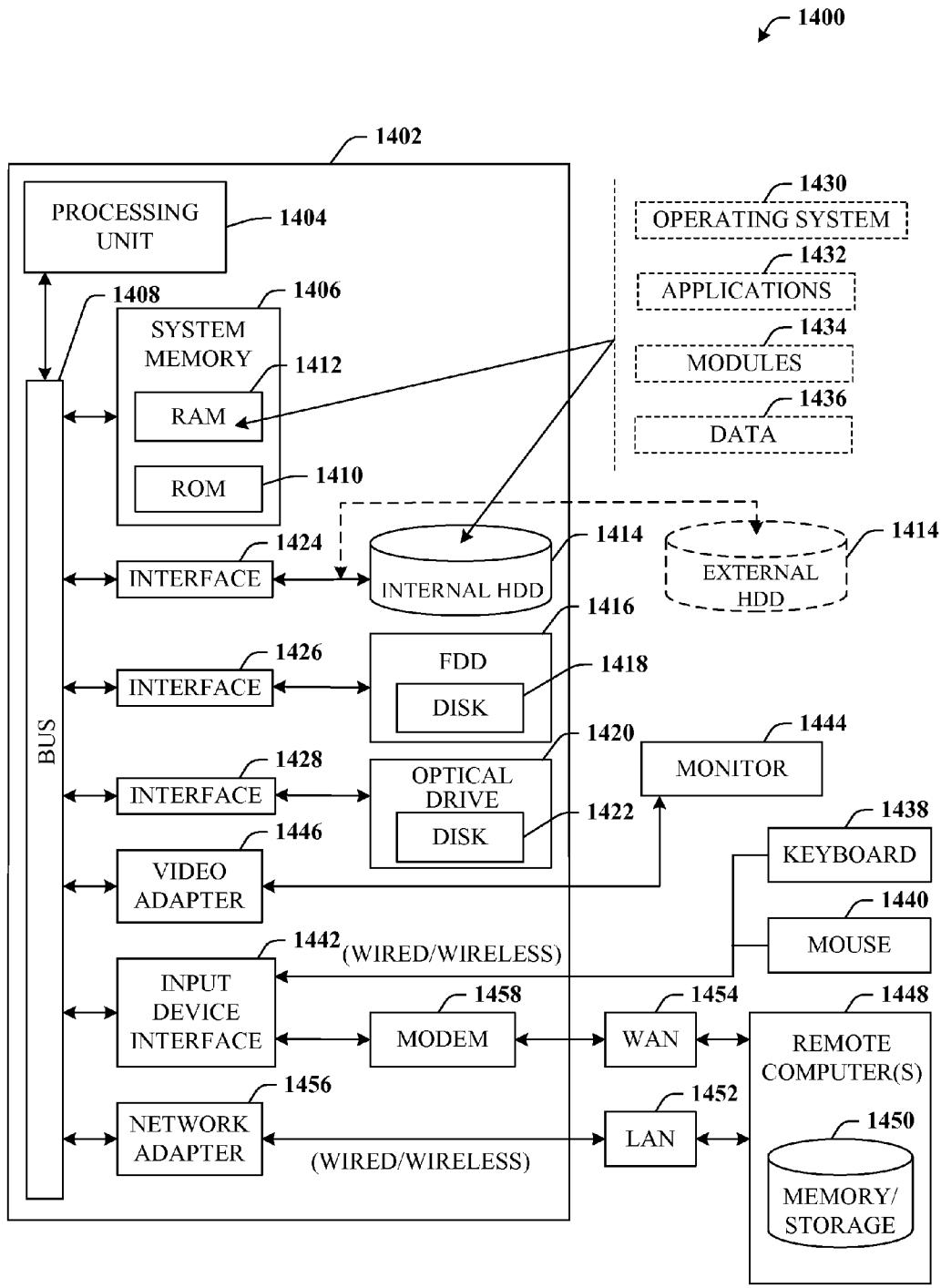
FIG. 14 illustrates a block diagram of a computer operable to execute the disclosed architecture.

Referring now to FIG. 14, there is illustrated a block diagram of an exemplary computer system operable to execute the disclosed architecture. In order to provide additional context for various aspects of the claimed subject matter, FIG. 14 and the following discussion are intended to provide a brief, general description of a suitable computing environment 1400 in which the various aspects of the claimed subject matter can be implemented. For example, various components of the systems and/or aspects thereof described supra can be implemented by way of the system 1400. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the exemplary environment 1400 for implementing various aspects of the claimed subject matter includes a computer 1402, the computer 1402 including a processing unit 1404, a system memory 1406 and a system bus 1408. The system bus 1408 couples to system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1494 interface technologies. Other external drive connection technologies are within contemplation of the claimed subject matter.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the claimed subject matter can be implemented with various commercially available operating systems or combinations of operating systems.

A user can enter commands and information into the computer 1402 through one or more wired/wireless input devices, e.g. a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1494 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g. a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 15:
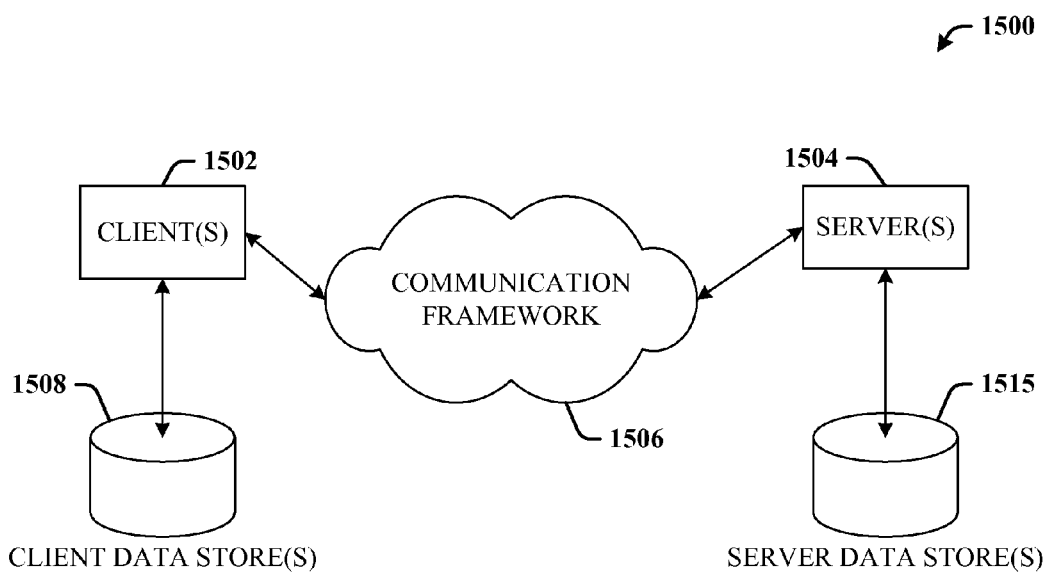
FIG. 15 illustrates a schematic block diagram of an exemplary computing environment.

Referring now to FIG. 15, there is illustrated a schematic block diagram of an exemplary computer compilation system operable to execute the disclosed architecture. The system 1500 includes one or more client(s) 1502. The client(s) 1502 can be hardware such as a digital camera with computer interface support and/or software (e.g., threads, processes, computing devices). The client(s) 1502 can house cookie(s) and/or associated contextual information by employing the claimed subject matter, for example.

The system 1500 also includes one or more server(s) 1504. The server(s) 1504 can also be hardware and/or software (e.g., threads, processes, computing devices). The servers 1504 can house threads to perform transformations by employing the claimed subject matter, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes" or "include" are used in either the detailed description or the claims, such term is intended to be inclusive in a manner similar to the term "comprising" as "comprising" is interpreted when employed as a transitional word in a claim.

What is claimed is:

1. A computer-implemented system that facilitates caching of local results for location-based queries, comprising:
   a cache with a plurality of bags stored therein,
      wherein each respective bag stores results of a previous location-based query in a location-independent manner while still preserving geographic location information associated with the previous location-based query,
      wherein each respective bag is associated with a location-independent key that relates to a search string of the previous location-based query that returned the results stored in the bag, and
      wherein the results stored in each respective bag are documents that include the location-independent key and are ranked in order based upon at least one of criteria of the previous location-based query or a document ID; and
   a search component that:
      receives a location-based query,
      generates a location-independent search string key by removing geographic location information from the received location-based query while still preserving the geographic location information,
      selects a subset of the plurality of bags in the cache in which the location-independent key associated with each respective bag matches the generated location-independent search-string key,
      selects a best bag from the selected subset of bags that stores the best available results for the received query by comparing the preserved geographic location information associated with each of the bags in the selected subset of bags to the preserved geographic location information of the received location-based query and identifying as the best bag the bag associated with a geographic location nearest to the geographic location associated with the received query,
      and returns a subset of results stored in the best bag when the best bag meets a threshold, even if the geographic location associated with the received location-based query is not an exact match with the geographic location associated with the best bag.

2. The system of claim 1, wherein the documents are ranked in order based upon criteria of the previous location-based query, and wherein the criteria is at least one of coordinates, distance, reputation or price.

3. The system of claim 1, wherein the search component determines whether the best bag satisfies a threshold.

4. The system of claim 3, wherein if the best bag satisfies the threshold, it is likely that there are a sufficient number of results in the best bag to satisfy the location-based query.

5. The system of claim 3, wherein the search component, in response to the location-based query, returns the subset of the results stored in the best bag if the threshold is satisfied.

6. The system of claim 5, wherein the subset of the results is re-ranked based upon criteria of the location-based query.

7. The system of claim 3, further comprising a data store, wherein the search component, in response to the location-based query, returns back-end results from the data store if the threshold is not satisfied.

8. The system of claim 7, wherein the back-end results are stored in a bag in the cache.

9. The system of claim 1, further comprising:
   an interpolation component that:
      graphs a first circle centered at a point $P_1$ with a radius, $R_1$, which is the distance from $P_1$ to an Nth document, and an area $S_1$,
         wherein point $P_1$ represents the geographic location associated with the previous query whose results are stored in the best bag,
         wherein N is the number of documents stored in the best bag, and
         wherein the N documents are ordered 1 through N;
      graphs a second circle centered at a point $P_2$ with a radius $R_2$, which is the distance from $P_2$ to an Mth document, and an area $S_2$,
         wherein point $P_2$ represents the geographic location associated with the query received by the search component,
         wherein M is the number of documents in a subset of the N documents stored in the best bag that meet criteria of the query, and
         wherein the M documents are ordered 1 through M; and
      determines an area of overlap, $S_3$,
         wherein the search component determines if the M documents are adequate to satisfy the query by comparing a ratio based in part on the area of overlap, $S_3$, to a threshold, and
         wherein the search component returns the M documents as a result of the received query when the M documents are determined to be adequate to satisfy the query.

10. The system of claim 9, wherein the radius, $R_1$ is a distance to the Nth document in terms of the criteria, and wherein the radius, $R_2$ is a distance to the Mth document in terms of the criteria.

11. The system of claim 9, wherein the area of overlap, $S_3$, is an intersection of $S_1$ and $S_2$, and wherein the ratio is $S_3/S_2$.

12. The system of claim 9, wherein the M documents satisfy the query when the ratio is greater than or equal to the threshold.

13. The system of claim 9, wherein the threshold is 0.75.

14. The system of claim 9, further comprising an intelligence component that dynamically sets the threshold.

15. The system of claim 9, wherein the criteria is at least one of coordinates, distance, reputation, price, religious requirements, allergy requirements, or a user preference.

16. The system of claim 9, wherein the search component re-orders the 1 through M documents based upon a respective distance from $P_2$.

* * * * *

UNITED STATES PATENT AND TRADEMARK OFFICE
CERTIFICATE OF CORRECTION

PATENT NO. : 7,634,465 B2
APPLICATION NO. : 11/460807
DATED : December 15, 2009
INVENTOR(S) : Sareen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Ninth Day of November, 2010

David J. Kappos
*Director of the United States Patent and Trademark Office*